Patented Dec. 10, 1935

2,023,953

UNITED STATES PATENT OFFICE 2,023,953

YELLOW MONO-AZODYESTUFFS CAPABLE OF BEING CHROMED

Erich Fischer, Bad Soden-on-the-Taunus, and Herbert Kracker, Frankfort-on-the-Main, Germany, assignors to General Aniline Works, Inc., New York, N. Y., a corporation of Delaware No Drawing. Application November 7, 1933, Serial No. 697,080. In Germany November 15, 1932

4 Claims. (Cl. 260—87)

The present invention relates to yellow mono-azo-dyestuffs capable of being chromed; more particularly it relates to dyestuffs of the following general formula:

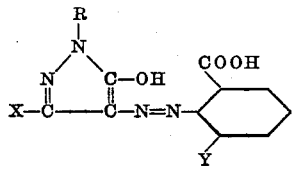

wherein X stands for an alkyl, carboxyl or carboxylic acid alkylester group, Y for halogen and R represents hydrogen, alkyl or a radical of the benzene or naphthalene series.

We have found that valuable yellow mono-azo-dyestuffs capable of being chromed may be obtained by combining diazotized 3-halogen-2-aminobenzene-1-carboxylic acids with pyrazolone derivatives.

The new dyestuffs dye wool yellow tints which, when after-chromed, are distinguished by very good fastness properties.

The dyestuffs may also be used for preparing color lakes.

In comparison with the azodyestuffs, obtainable by coupling diazotized 2-aminobenzene-1-carboxylic acid or 5-chloro-2-aminobenzene-1-carboxylic acid with pyrazolone derivatives, according to the statements of U. S. Patent No. 1,149,231, the dyestuffs of the present invention are distinguished by a better fastness to light. This unequivocal effect of the 3-halogen-anthranilic acids could not be foreseen and represents a considerable technical advance, especially with regard to the fact that the dyestuffs possess besides their very good fastness to light a very good leveling power as well as a very good fastness to washing and to fulling.

The following examples serve to illustrate the invention, but they are not intended to limit it thereto, the parts being by weight:

(1) 171.5 parts of 3-chloro-2-aminobenzene-1-carboxylic acid are diazotized in the usual manner. The diazo-solution is gradually run into a solution of 254 parts of 1(4'-sulfophenyl)-3-methyl-5-pyrazolone in sodium carbonate solution. When the coupling is finished, the dyestuff is precipitated with common salt in the usual manner, filtered by suction and dried. It forms a yellow powder which dyes wool from an acid bath yellow tints which, when after-chromed, are distinguished by a very good fastness to washing, to fulling and to light.

The dyestuff possesses the following formula:

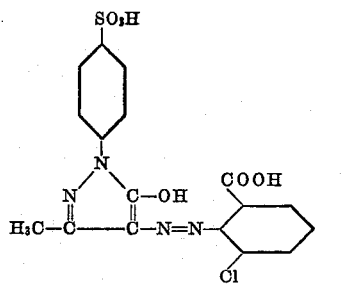

(2) 288.5 parts of 1-(2'-chloro-5'-sulfophenyl)-3-methyl-5-pyrazolone are dissolved in water and sodium carbonate to form a neutral solution, and a solution of 120 parts of sodium acetate is added thereto. Into the thus prepared coupling-solution there is run a diazo-solution from 226 parts of 3-bromo-2-aminobenzene-1-carboxylic acid. The dyeings which this dyestuff yields on wool, possess, when after-chromed, a more greenish hue but, otherwise, the same fastness properties as those of the dyestuff obtained according to the statements of Example 1.

The dyestuff corresponds with the following formula:

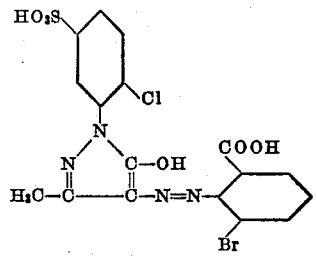

(3) By substituting in Examples 1 and 2 for the pyrazolones mentioned therein 394 parts of a pyrazolone of the following constitution:

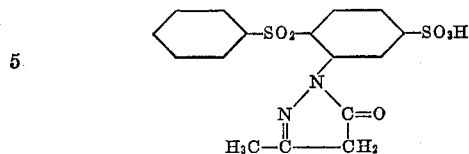

a dyestuff of similar fastness properties is obtained, yielding, however, tints of a still more greenish hue than those of the dyestuff obtained according to Example 2.

The pyrazolones, mentioned in the foregoing examples, may be replaced by others, for instance, by 1-(2',5' - dichloro - 4' - sulfophenyl) - 3 - methyl-5-pyrazolone, 1-(4'-chloro-2'-sulfophenyl) - 3 - methyl-5-pyrazolone, 1 - (2'- hydroxy-3'-carboxy-5'-sulfophenyl) - 3 - methyl-5-pyrazolone, 1-(4'-methyl-2'-sulfophenyl)-3-methyl- 5 -pyrazolone, 1 - (4'-sulfophenyl) -5-pyrazolone-3-carboxylic acid-ethyl ester, 1-(4'-sulfonaphthyl) -3-methyl-5-pyrazolone, furthermore, by pyrazolone derivatives of, for instance, the following constitution:

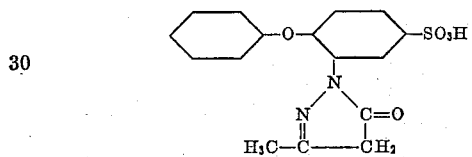

and

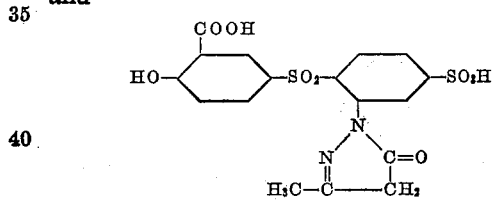

The following table indicates a number of dyestuffs obtainable according to the present invention, but does not comprise all possibilities for the preparation of dyestuffs of very good fastness to light by using other pyrazolone derivatives and other 3 - halogen-2-aminobenzene-1-carboxylic acids; it, therefore, is not intended to limit the invention to the dyestuffs mentioned therein:

We claim:
1. The mono-azodyestuffs of the general formula:

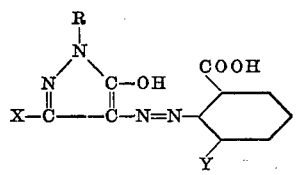

wherein X stands for a methyl, carboxyl or carboxylic acid alkylester group,

Y for halogen and

R represents hydrogen, alkyl or a radical of the benzene or naphthalene series, forming, when dry, yellow powders and yielding on wool yellow dyeings which, when after-chromed, possess very good fastness properties, particularly a very good fastness to light.

2. The mono-azo-dyestuffs of the general formula:

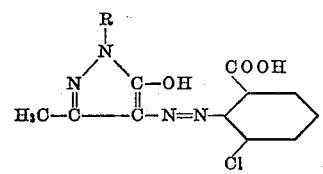

wherein R represents a radical of the benzene series, forming, when dry, yellow powders and yielding on wool yellow dyeings which, when after-chromed, possess very good fastness properties, particularly a very good fastness to light.

3. The mono-azodyestuff of the following formula:

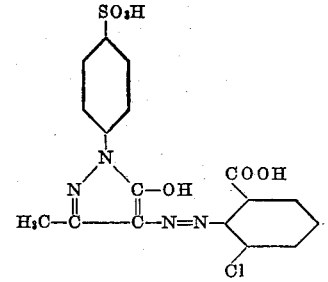

forming, when dry, a yellow powder and yielding on wool a yellow dyeing which, when after-

| | Diazo component from | Coupling component | Tint |
|---|---|---|---|
| 1 | 3-chloro-2-aminobenzene-1-carboxylic acid. | 1-(3'-sulfophenyl)-3-methyl-5-pyrazolone. | Greenish-yellow. |
| 2 | ___do___ | 1-(2'-sulfophenyl)-3-methyl-5-pyrazolone. | Do. |
| 3 | ___do___ | 1-(2',4'-dichloro-6'-sulfophenyl)-3-methyl-5-pyrazolone. | Do. |
| 4 | 3-bromo-2-aminobenzene-1-carboxylic acid. | 1-(4'-sulfophenyl)-5-pyrazolone-3-carboxylic acid-ethyl-ester. | Yellow. |
| 5 | 3-chloro-2-aminobenzene-1-carboxylic acid. | (see formula) | Do. |
| 6 | ___do___ | 1-(3'-sulfophenyl)-5-pyrazolone-3-carboxylic acid-methyl-ester. | Do. |
| 7 | 3-bromo-2-aminobenzene-1-carboxylic acid. | 1-(4'-chloro-2'-sulfophenyl)-5-pyrazolone-3-carboxylic acid-butyl-ester. | Do. |
| 8 | 3-chloro-2-aminobenzene-1-carboxylic acid. | 1-(2'-chloro-5'-sulfophenyl)-5-pyrazolone-3-carboxylic acid-ethyl-ester. | Do. | chromed, possesses a very good fastness to washing, fulling and light.
4. The mono-azodyestuff of the following formula:
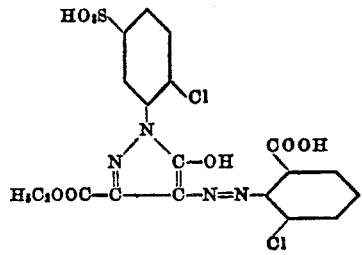
forming, when dry, a yellow powder and yielding on wool a yellow dyeing which, when afterchromed, possesses a very food fastness to washing, fulling and light.
ERICH FISCHER.
HERBERT KRACKER.